US008629070B2

(12) United States Patent
Oles et al.

(10) Patent No.: US 8,629,070 B2
(45) **Date of Patent: *Jan. 14, 2014**

(54) FLAT TEXTILE STRUCTURES WITH SELF-CLEANING AND WATER-REPELLENT SURFACE

(75) Inventors: Markus Oles, Hattingen (DE); Edwin Nun, Billerbeck (DE)

(73) Assignee: Evonik Degussa GmbH, Essen (DE)

( * ) Notice: Subject to any disclaimer, the term of this patent is extended or adjusted under 35 U.S.C. 154(b) by 2279 days.

This patent is subject to a terminal disclaimer.

(21) Appl. No.: 10/474,624

(22) PCT Filed: Feb. 26, 2002

(86) PCT No.: PCT/EP02/02013

§ 371 (c)(1), (2), (4) Date: Feb. 19, 2004

(87) PCT Pub. No.: WO02/084016

PCT Pub. Date: Oct. 24, 2002

(65) Prior Publication Data

US 2004/0154106 A1 Aug. 12, 2004

(30) Foreign Application Priority Data

Apr. 12, 2001 (DE) .................................. 101 18 346

(51) Int. Cl.

*B32B 5/02* (2006.01)
*B32B 27/02* (2006.01)
*B32B 17/02* (2006.01)

(52) U.S. Cl.

USPC ................. 442/79; 442/85; 442/93; 442/152; 442/164; 442/172; 977/773

(58) Field of Classification Search

USPC .............. 428/141, 143, 913; 8/115.51, 115.7, 8/116.1; 442/79, 85, 86, 93, 152, 164, 442/172; 977/773

See application file for complete search history.

(56) References Cited

U.S. PATENT DOCUMENTS

| | | | | | |
|---|---|---|---|---|---|
| 2,350,696 | A | * | 6/1944 | Peirce et. al. | 139/420 R |
| 3,354,022 | A | * | 11/1967 | Johnson, Jr. et al. | 428/167 |
| 4,519,410 | A | * | 5/1985 | Kubacki | 135/93 |
| 4,600,615 | A | * | 7/1986 | Hyodo et al. | 138/125 |
| 5,432,000 | A | * | 7/1995 | Young et al. | 428/372 |
| 5,985,773 | A | * | 11/1999 | Lee | 442/89 |
| 6,455,158 | B1 | * | 9/2002 | Mei et al. | 428/403 |
| 6,566,452 | B1 | * | 5/2003 | Bladel et al. | 525/199 |
| 6,811,856 | B2 | | 11/2004 | Nun et al. | |
| 6,852,389 | B2 | | 2/2005 | Nun et al. | |
| 6,858,284 | B2 | | 2/2005 | Nun et al. | |
| 6,977,094 | B2 | | 12/2005 | Oles et al. | |
| 7,083,828 | B2 | | 8/2006 | Müller et al. | |
| 7,235,298 | B2 | | 6/2007 | Katusic et al. | |
| 7,374,743 | B2 | | 5/2008 | Katusic et al. | |
| 2002/0148601 | A1 | | 10/2002 | Roos et al. | |
| 2002/0150723 | A1 | | 10/2002 | Oles et al. | |
| 2002/0164443 | A1 | | 11/2002 | Oles et al. | |
| 2002/0192385 | A1 | | 12/2002 | Jenkner et al. | |
| 2003/0013795 | A1 | | 1/2003 | Nun et al. | |
| 2003/0049396 | A1 | | 3/2003 | Oles et al. | |
| 2003/0134086 | A1 | | 7/2003 | Nun et al. | |
| 2003/0147932 | A1 | | 8/2003 | Nun et al. | |
| 2004/0028913 | A1 | | 2/2004 | Hennige et al. | |
| 2005/0070193 | A1 | | 3/2005 | Hennige et al. | |
| 2005/0084653 | A1 | | 4/2005 | Nun et al. | |
| 2005/0112326 | A1 | | 5/2005 | Nun et al. | |
| 2005/0118433 | A1 | | 6/2005 | Oles et al. | |
| 2005/0118911 | A1 | | 6/2005 | Oles et al. | |
| 2005/0253302 | A1 | | 11/2005 | Nun et al. | |
| 2006/0235143 | A1 | | 10/2006 | Muller et al. | |
| 2008/0084686 | A1 | | 4/2008 | Gutsch et al. | |
| 2008/0206174 | A1 | | 8/2008 | Bergandt et al. | |

FOREIGN PATENT DOCUMENTS

| | | | | | |
|---|---|---|---|---|---|
| WO | WO 9604123 | A1 | * | 2/1996 | B29C 59/00 |
| WO | 97 28303 | | | 8/1997 | |
| WO | WO 9858984 | A1 | * | 12/1998 | |
| WO | 00 58410 | | | 10/2000 | |
| WO | WO 00/58415 | | * | 10/2000 | C09K 3/18 |
| WO | 01 32820 | | | 5/2001 | |
| WO | 01 96512 | | | 12/2001 | |

OTHER PUBLICATIONS

Heinze et al., "Solvents Applied in the Field of Cellulose Chemistry—A Mini Review", Polimeros: Ciencia e Tecnologia, vol. 15, No. 2, Jun. 2005, p. 84-90.*
U.S. Appl. No. 10/556,092, filed Nov. 9, 2005, Oles, et al.
U.S. Appl. No. 10/526,559, filed Mar. 4, 2005, Nun, et al.
U.S. Appl. No. 11/312,469, filed Dec. 21, 2005, Nun, et al.
U.S. Appl. No. 11/312,340, filed Dec. 21, 2005, Hennige, et al.
U.S. Appl. No. 10/546,979, filed Aug. 26, 2005, Nun, et al.
U.S. Appl. No. 11/321,285, filed Dec. 21, 2005, Oles, et al.

(Continued)

*Primary Examiner* — Matthew Matzek
(74) *Attorney, Agent, or Firm* — Oblon, Spivak, McClelland, Maier & Neustadt, L.L.P.

(57) ABSTRACT

Textile fabrics having a self cleaning and water repellent surface, constructed from A) at least one synthetic and/or natural textile base material and
B) an artificial, at least partly hydrophobic surface having elevations and depressions comprising particles securely bonded to said base material A without adhesives, resins or coatings, obtained by treating said base material A with at least one solvent containing said particles in undissolved form and removing said solvent to leave at least a portion of said particles securely bonded to the surface of said base material A.

22 Claims, 4 Drawing Sheets

(56) References Cited

OTHER PUBLICATIONS

U.S. Appl. No. 11/312,557, Dec. 21, 2005, Oles, et al.
U.S. Appl. No. 10/111,407, filed May 6, 2002, Oles, et al.
U.S. Appl. No. 10/527,641, Mar. 14, 2005, Nun, et al.
U.S. Appl. No. 09/241,077, filed Feb. 1, 1999, Peters, et al.
U.S. Appl. No. 10/551,841, filed Oct. 3, 2005, Nun, et al.
U.S. Appl. No. 10/518,533, filed Dec. 30, 2004, Oles et al.
U.S. Appl. No. 10/519,951, filed Dec. 29, 2004, Oles et al.
U.S. Appl. No. 10/506,994, filed Sep. 9, 2004, Nun, et al.
U.S. Appl. No. 10/506,604, filed Sep. 10, 2004, Nun, et al.
U.S. Appl. No. 10/506,238, filed Sep. 8, 2004, Nun, et al.
U.S. Appl. No. 10/506,236, filed Sep. 8, 2004, Oles, et al.
U.S. Appl. No. 10/575,268, filed Apr. 11, 2006, Hennige, et al.
U.S. Appl. No. 10/588,952, filed Aug. 10, 2006, Nun, et al.
U.S. Appl. No. 11/572,548, filed Jan. 23, 2007, Nun, et al.
U.S. Appl. No. 12/300,054, filed Nov. 7, 2008, Bergandt, et al.
U.S. Appl. No. 12,159,103, filed Jun. 25, 2008, Nun, et al.
U.S. Appl. No. 12,037,431, filed Feb. 26, 2008, Bergandt, et al.
Xu Y, et al. "Solubility and Rheological Behavior of Silk Fibroin (*Bombyx mori*) in N-methyl Morpholine N-oxide" Int J Biol Macromol. Apr. 2005;35(3-4):155-61.
Haeyong Kweon, et al. "Dissolution and Characterization of Regenerated *Antheraea Pernyi* Silk" Article first published online: Aug. 13, 2001, http://onlinelibrary.wiley.com/doi/10.1002/app.1901/abstract.
R. Rose, et al. "Increased Solubility of Hair from Hypotrichotic Hereford's" Article first published online: May 13, 2010, http://onlinelibrary.wiley.com/doi/10.1111/j.1439-0442.1983.tb00995.x/abstract.

* cited by examiner

Polyester Fabric

Polyester Fabric

*Polyester Fabric and Particle*

*Polyester Fabric and Particle*

FLAT TEXTILE STRUCTURES WITH SELF-CLEANING AND WATER-REPELLENT SURFACE

The present invention relates to textile fabrics having a self cleaning and water repellent surface.

It is known that good surface self cleaning requires the surface to have a certain roughness as well as highly hydrophobic properties. A suitable combination of texture and hydrophobicity will ensure that even small amounts of moving water will entrain soil particles adhering to the surface and clean the surface (WO 96/04123; U.S. Pat. No. 3,354,022).

EP 0 933 388 discloses that such self cleaning surfaces require an aspect ratio of >1 and a surface energy of less than 20 mN/m, aspect ratio being defined as the ratio of the height of the texture to its width. The aforementioned criteria are actualized in nature, for example in the lotus leaf. The surface of the plant, formed from a waxy hydrophobic material, has elevations spaced apart by a few μm. Water droplets substantially contact only these peaks. Such water repellent surfaces have been extensively described in the literature.

Swiss patent 268,258 describes a process wherein textured surfaces are created by applying powders such as kaolin, talc, clay or silica gel. The powders are immobilized on the surface by means of oils and resins based on organosilicon compounds (examples 1 to 6).

EP 0 909 747 teaches a process for producing a self cleaning surface. The surface has hydrophobic elevations 5 to 200 μm in height. A surface of this type is produced by application of a dispersion of powder particles and an inert material in a siloxane solution and subsequent curing. The texture forming particles are therefore immobilized on the substrate by an auxiliary medium.

WO 00/58410 concludes that it is technically possible to make surfaces of articles artificially self cleaning. The surface textures necessary for this, composed of elevations and depressions, have a distance in the range from 0.1 to 200 μm between the elevations of the surface textures and an elevation height in the range from 0.1 to 100 μm. The materials used for this purpose have to consist of hydrophobic polymers or durably hydrophobicized material. Particle detachment from the support matrix has to be prevented.

The use of hydrophobic materials, such as perfluorinated polymers, for producing hydrophobic surfaces is known. A further development of these surfaces comprises texturing the surfaces in the μm range to nm range. U.S. Pat. No. 5,599,489 discloses a process whereby a surface can be made particularly repellent by bombardment with particles of an appropriate size and subsequent perfluorination. Another process is described by H. Saito et al. in “Service Coatings International”, 4, 1997, p. 168 et seq. Particles of fluoropolymers are applied to metal surfaces, producing a surface with much reduced wettability with regard to water, as demonstrated by an appreciably reduced tendency to ice up.

The principle is borrowed from nature. Small contact surfaces reduce the Van der Waals interaction which is responsible for adhesion to planar surfaces having a low surface energy. For example, the leaves of the lotus plant have elevations made of a wax which lower the contact area with water. WO 00/58410 describes the textures and claims the formation thereof by spray application of hydrophobic alcohols, such as 10-nonacosanol, or alkanediols, such as 5,10-nonacosanediol. The disadvantage with this is that the self cleaning surfaces lack stability, since detergents cause disintegration of the structure.

Processes for producing these textured surfaces are likewise known. As well as processes utilizing a master texture to mold these textures in full detail by injection molding or embossing, there are processes where particles are applied to a surface (U.S. Pat. No. 5,599,489).

However, the common feature is that the self cleaning behavior of surfaces is associated with a very high aspect ratio. High aspect ratios are difficult to obtain industrially and possess low mechanical stability.

It is an object of the present invention to provide textile fabrics having very good water repellent and self cleaning surfaces without these properties being lost in the everyday use of the articles manufactured from these textile fabrics, which shall be producible by a process without substantial engineering requirements. In view of the properties of the textile fabrics in use, there shall be no need to secure particles by means of an adhesive or the like. It is a further object to provide textile fabrics having a self cleaning and water repellent surface, a high aspect ratio of the elevations, a high contact angle with water and capability of introduction into textile fabrics via a nonembossing process.

It has been found that, surprisingly, it is possible to durably bond particles to the surface of textile fabrics. The stated objects are achieved by treatment of the textile fabrics with particles and solvent. Upon removal of the solvent the particles are securely bonded to the textile fabrics without the weave having been destroyed.

Figure 1:
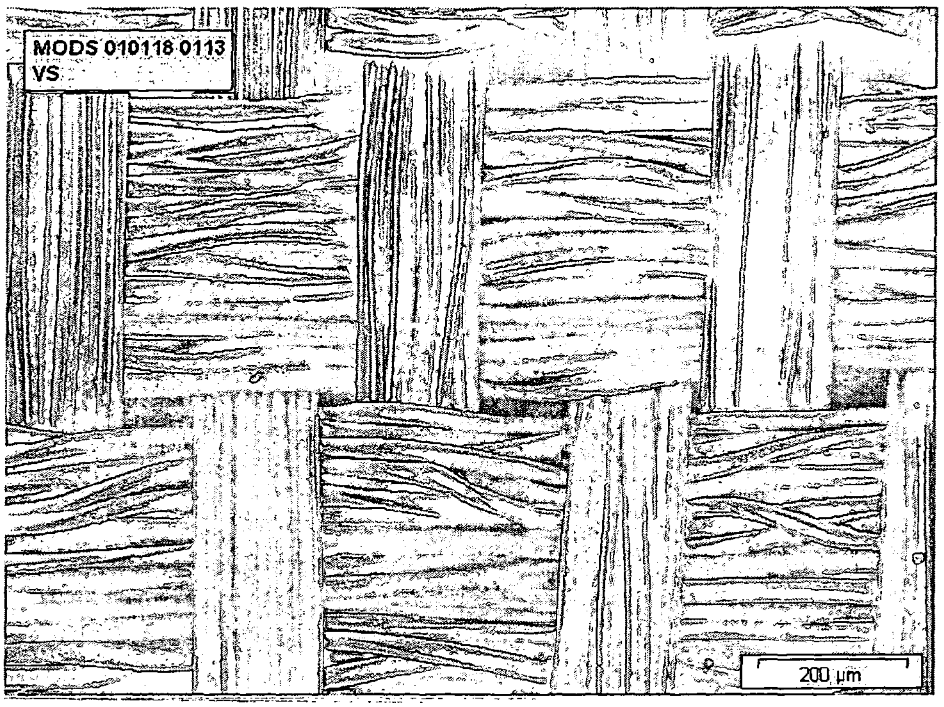
FIG. 1 shows a scanning electron micrograph of an untreated polyester fabric at low resolution.
Figure 2:
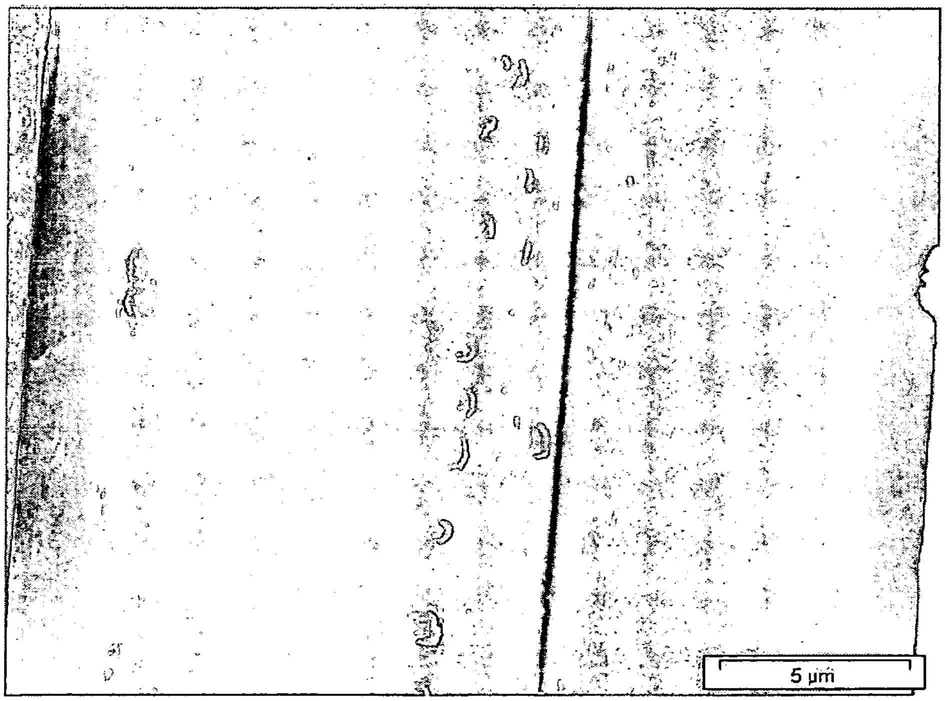
FIG. 2 shows scanning electron micrograph of an untreated polyester fabric at high resolution.
Figure 3:
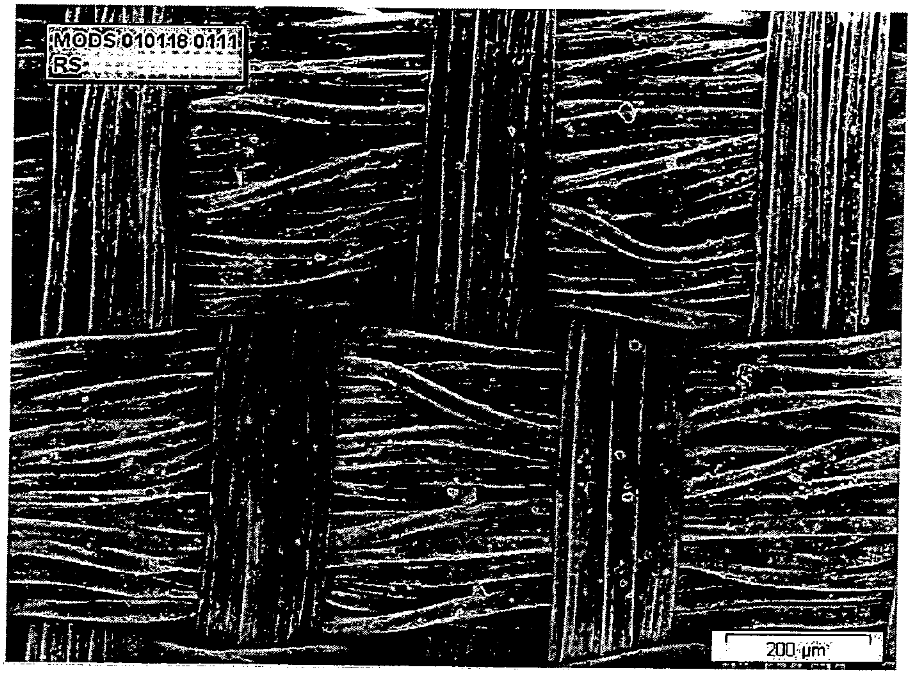
FIG. 3 shows a scanning electron micrograph of a polyester fabric treated according to example 1 at low resolution.
Figure 4:
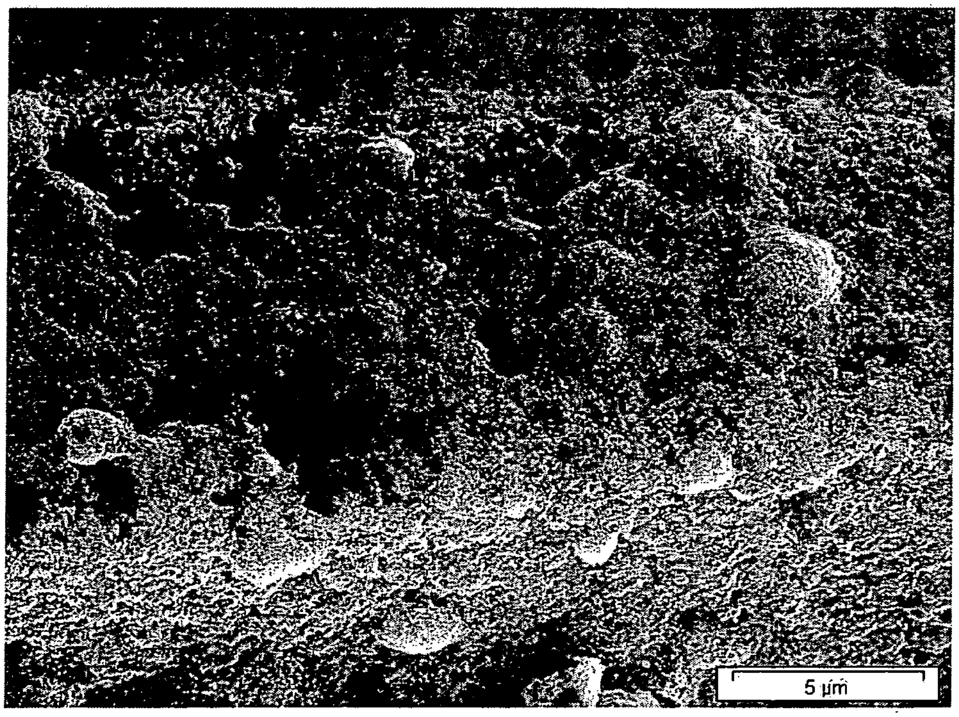
FIG. 4 shows a scanning electron micrograph of a polyester fabric treated according to example 1 at high resolution.

The present invention accordingly provides textile fabrics having a self cleaning and water repellent surface, constructed from A) at least one synthetic and/or natural textile base material and B) an artificial, at least partly hydrophobic surface having elevations and depressions comprising particles securely bonded to said base material A without adhesives, resins or coatings, obtained by treating said base material A with at least one solvent containing said particles in undissolved form and removing said solvent to leave at least a portion of said particles securely bonded to the surface of said base material A.

The present invention further provides textile fabrics having a self cleaning and water repellent surface, constructed from A) at least one synthetic and/or natural textile base material and B) an artificial, at least partly hydrophobic surface having elevations and depressions comprising particles securely bonded to said base material A without adhesives, resins or coatings, and their use for manufacturing textile articles.

It has been determined that the inventive textile fabrics having a self cleaning and water repellent surface and the textiles manufactured therefrom do not lose their self cleaning properties even on contact with water together with detergents. However, this presupposes that the detergents are completely washed off again and that a hydrophobic surface is present.

The textile base material A can be formed by a wide variety of customary polymers, for example polycarbonates, poly(meth)acrylates, polyamides, PVC, polyethylenes, polypropylenes, polystyrenes, polyesters, polyether sulfones or polyalkylene terephthalates and also blends or copolymers thereof.

Useful base materials also include natural materials composed of plant parts selected from cotton, kapok, flax, hemp, jute, sisal and coir, or mineral origin or blends of natural and artificial materials.

The base material A to be used according to the invention will now be more particularly described by way of example.

The finished textile goods are generally prepared from polymeric filaments produced by spinning.

The fibers and yarns are converted into textile fabrics. This can be done using the following processes:

Weaving: woven goods include wovens, carpets and bobbinets which are characterized by their classic interweaving of warp and fill threads.

Knitting by loop forming and loop drawing: this produces knot goods such as pullovers for example.

Making bobbin lace.

Needling: this creates felts, needlefelt and tufted carpets which together with the nonwovens count as bonded textile materials.

Yarn and piece goods are processed by subjecting them to various mechanical and chemical operations, for example combing, weighting, impregnating, shrink resist and crease resist finishing, mercerizing, dyeing and printing, metallizing, texturing, etc., that are intended to improve or modify the natural properties of the fibers with regard to later use. The criteria by which the utility of a finished textile material is judged using suitable textile testing methods include strength on exposure to tensile and bursting forces and also to abrading action, crease recovery in the dry and wet state and hence the associated wash-and-wear characteristics, ability to withstand for example electrostatic charge build-up, flammability or action of rain, chlorine retention, soiling behavior, air perviousness, weave closeness, resistance to felting and shrinkage, swellability, hydrophilicity, hydrophobicity and oleophobicity, luster, hand, wash, perspiration and color fastness, resistance to microbial destruction, etc.

Polymeric fabrics/textiles, i.e., base material A for the purposes of the invention, can be produced from various fibers. The abovementioned processes are suitable for most fibers composed of thermoplastic materials, such as PET, PA66, PE or PP. Fibers are usually traded under protected brand names. Examples are Perlon®, Diolen®, Trevira®, Orleon®, but also trivial names such as acrylic fibers, polyester fibers, olefin fibers, aramid fibers, etc., are customary.

The particles used may be particles comprising at least one material selected from silicates, minerals, metal oxides, metal powders, silicas, pigments or polymers. Preference is given to using particles having a particle diameter of 0.02 to 100 μm, particularly preferably of 0.1 to 50 μm and most preferably of 0.1 to 30 μm. But it is also possible to use particles agglomerated or aggregated (from primary particles) to a size of 0.2-100 μm.

The particles are generally bonded to the surface of the polymer fibers in such a way that they are spaced 0-10 particle diameters apart.

It has surprisingly been found for the textile fabrics of the invention that the particles on the base material A do not have to be very close together. On the contrary, it is possible for the base material A to be loaded with particles only intermittently and to have free areas of 2-3 particle diameters.

The wetting of solids can be described by the contact angle formed by a water droplet with the surface. A contact angle of 0 degrees indicates complete wetting of the surface. The contact angle on fibers is generally measured by the Wilhelmy method. The thread is wetted by a liquid and the force pulling the fiber into the liquid owing to the surface tension is measured. The higher the contact angle is, the poorer the wettability of the surface. The aspect ratio is defined as the ratio of the height to the width of the surface texture.

The textile sheets of the invention have high contact angles and a high aspect ratio for the elevations.

It can be advantageous for the particles used to have a textured surface. Preference is given to using particles having an irregular fine structure in the nanometer range on the surface. The use of such particles is novel and forms the subject matter of a separate patent application (DE10118345).

The particles used, especially the particles used with an irregular fine texture in the nanometer range on the surface, are preferably particles comprising at least one compound selected from pyrogenic silica, precipitated silicas, aluminum oxide, silicon dioxide, pyrogenic and/or doped silicates or pulverulent polymers. It can be advantageous for the particles used to have hydrophobic properties.

The hydrophobic properties of the particles can be inherent to the material used for the particles. But it is also possible to use hydrophobicized particles, which have hydrophobic properties following a suitable treatment, for example a treatment with at least one compound from the group of the alkylsilanes, the fluoroalkylsilanes or the disilazanes.

It is similarly possible in the invention for the particles to be provided with hydrophobic properties after bonding to the base material A. In this case too the particles are preferably provided with hydrophobic properties by a treatment with at least one compound from the group of the alkylsilanes, the fluoroalkylsilanes or the disilazanes.

The preferred particles will now be more particularly described.

The particles used can come from different sectors. They may for example be silicates, doped silicates, minerals, metal oxides, aluminum oxide, silicas or pyrogenic silicates, aerosils or pulverulent polymers, for example spray dried and agglomerated emulsions or cryogenically milled PTFE. Useful particle systems include in particular hydrophobicized pyrogenic silicas, known as aerosils. Generation of self cleaning surfaces requires hydrophobicity as well as texture. The particles used may themselves be hydrophobic as in the case of PTFE for example. The particles may have been rendered hydrophobic, for example Aerosil VPR 411 or Aerosil R 8200. However, they may also be hydrophobicized subsequently. It is unimportant in this context whether the particles are hydrophobicized before or after application. These for example for Aeroperl 90/30, Sipernat silica 350, alumina C, zirconium silicate, vanadium-doped or Aeroperl P 25/20. The latter is advantageously hydrophobicized by treatment with perfluoroalkylsilane and subsequent heat treatment.

Useful solvents include in principle all solvents for the respective base materials A. For polymers there is a list for example in Polymer Handbook, Second Edition; J. Brandrup, E. H. Immergut; John Wiley & Sons, New York—London—Sydney—Toronto, 1975, in chapter IV, Solvents and Non-Solvents for Polymers.

Useful solvents include in principle any suitable compound from the group of the alcohols, the glycols, the ethers, the glycol ethers, the ketones, the esters, the amides, the nitro compounds, the hydrohalocarbons, the aliphatic and aromatic hydrocarbons or a mixture of one or more of these compounds, for example methanol, ethanol, propanol, butanol, octanol, cyclohexanol, phenol, cresol, ethylene glycol, diethylene glycol, diethyl ether, dibutyl ether, anisole, dioxane, dioxolane, tetrahydrofuran, monoethylene glycol ether, diethylene glycol ether, triethylene glycol ether, polyethylene glycol ether, acetone, butanone, cyclohexanone, ethyl acetate, butyl acetate, isoamyl acetate, ethylhexyl acetate, glycol esters, dimethylformamide, pyridine, N-methylpyrrolidone, N-methylcaprolactone, acetonitrile, carbon disulfide, dimethyl sulfoxide, sulfolane, nitrobenzene, dichloromethane, chloroform, tetrachloromethane, trichloroethene, tetrachloroethene, 1,2-dichloroethane, chlorophenol, (hydro) chlorofluorocarbons, petroleum spirits, petroleum ethers, cyclohexane, methylcyclohexane, decalin, tetralin, terpenes, benzene, toluene and xylene or mixtures thereof.

The solvent used can in principle be employed at temperatures of −30 to 300° C. Generally, the temperature of the solvent is limited by its boiling point and by the Tg of base material A.

In a particularly preferred embodiment of the invention, said solvent which contains said particles is heated to a temperature of 25 to 100° C. and preferably of 50 to 85° C. before application to the polymer surface.

The invention likewise provides for the use of the textile fabrics for manufacturing articles having a self cleaning and water repellent surface, especially for manufacturing garments exposed to high levels of soil and water, especially for ski sports, alpine sports, motor sports, motorcycle sports, motocross sports, sailing sports, textiles for the leisure sector and also industrial textiles such as tents, awnings and blinds, umbrellas, tablecloths and cabriolet covers. The invention also provides for the use for manufacturing carpets, sewing threads, ropes, wallhangings, textiles, wallpapers, garments, tents, decorative curtains, theater curtains and stitching.

The example hereinbelow illustrates the invention.

Use Example 1

A woven polyester fabric having a fiber diameter of 20 μm is pulled into a 50° C. DMSO bath containing a 1% Aeroperl 8200 suspension. The residence time of the fabric in the solution is 10 seconds. Before the fabric is wound up, it is passed over a heat source to evaporate the solvent. Table 1 reports the static contact angles measured on the fabric before and after application of the particles. Illustrations 1 to 4 depict scanning electron micrographs of a polyester fabric which has been treated with Aerosil R 8200 and of a polyester fabric which has not been treated with Aerosil R 8200.

TABLE 1

Static contact angle before and after application of particulate systems.

| | Contact angle |
|---|---|
| Polyester fabric | 140 |
| Polyester fabric + particles | 150-160 |

What is claimed is:

1. A textile fabric having a self cleaning and water repellent surface, comprising:

A) at least one synthetic and/or natural textile base material A having a weave and B) an artificial, at least partly hydrophobic surface having elevations and depressions comprising particles bonded to the base material A without adhesives, resins or coatings, wherein the surface is obtained by:

treating the base material A with a bath comprising at least one solvent for the textile base material and the particles, and removing the solvent to leave at least a portion of the particles bonded to the surface of the base material A, without the weave being destroyed, the particles are not dissolved in the solvent for the textile base material, and the natural textile base material A comprises parts selected from the group consisting of animal hair, silk, a material of mineral origin and a blend of natural and artificial materials.

2. The textile fabric as claimed in claim 1, wherein the particles are suspended in the solvent for the textile base material.

3. The textile fabric as claimed in claim 1, wherein the solvent for the textile base material is at least one selected from the group consisting of alcohols, glycols, ethers, glycol ethers, ketones, esters, amides, nitro compounds, (hydro)halocarbons, aliphatic and aromatic hydrocarbons and mixtures thereof.

4. The textile fabric as claimed in claim 3, wherein the solvent for the textile base material is at least one selected from the group consisting of methanol, ethanol, propanol, butanol, octanol, cyclohexanol, phenol, cresol, ethylene glycol, diethylene glycol, diethyl ether, dibutyl ether, anisole, dioxane, dioxolane, tetrahydrofuran, monoethylene glycol ether, diethylene glycol ether, triethylene glycol ether, polyethylene glycol ether, acetone, butanone, cyclohexanone, ethyl acetate, butyl acetate, isoamyl acetate, ethylhexyl acetate, glycol esters, dimethylformamide, pyridine, N-methylpyrrolidone, N-methylcaprolactone, acetonitrile, carbon disulfide, dimethyl sulfoxide, sulfolane, nitrobenzene, dichloromethane, chloroform, tetrachloromethane, trichloroethene, tetrachloroethene, 1,2-dichloroethane, chlorophenol, (hydro)chlorofluorocarbons, petroleum spirits, petroleum ethers, cyclohexane, methylcyclohexane, decalin, tetralin, terpenes, benzene, toluene, xylene and mixtures thereof.

5. The textile fabric as claimed in claim 1, wherein a temperature of the solvent for the textile base material during the treating of the textile base material is in a range of from −30° C. to 300° C.

6. The textile fabric as claimed in claim 5, wherein the temperature of the solvent for the textile base material during the treating of the textile base material is 50 to 85° C.

7. The textile fabric as claimed in claim 1, wherein an average particle diameter of the particles is in the range of from 0.02 to 100 μm.

8. The textile fabric as claimed in claim 7, wherein the average particle diameter is 0.1 to 30 μm.

9. The textile fabric as claimed in claim 1, wherein the particles comprise an irregular fine surface structure in the nanometer range.

10. The textile fabric as claimed in claim 1, wherein the particles are selected from the group consisting of silicates, minerals, metal oxides, metal powders, silicas, pigments and polymers.

11. The textile fabric as claimed in claim 1, wherein the particles are selected from the group consisting of pyrogenic silicas, precipitated silicas, aluminum oxide, silicon dioxide, doped silicates, pyrogenic silicates and pulverulent polymers.

12. The textile fabric as claimed in claim 1, wherein the particles have hydrophobic properties.

13. The textile fabric as claimed in claim 1, wherein the particles have hydrophobic properties due to a treatment with a hydrophobic compound.

14. The textile fabric as claimed in claim 13, wherein the particles are provided with hydrophobic properties before or after bonding to the base material A.

15. The textile fabric as claimed in claim 13, wherein the particles are provided with hydrophobic properties by a treatment with at least one compound selected from the group consisting of the alkylsilanes, fluoroalkylsilanes and disilazanes.

16. The textile fabric as claimed in claim 13, wherein a spacing between individual particles bonded to the surface of the base material A is from 0 to 10 particle diameters.

17. A textile article having a self cleaning and water repellent surface comprising the textile fabric of claim 1.

18. Garments exposed to high levels of soil and water and industrial textiles comprising the textile articles of claim 17, wherein the garments are garments for ski sports, alpine sports, motor sports, motorcycle sports, motocross sports, sailing sports, and for leisure, and the industrial textiles are textiles for tents, awnings, blinds, umbrellas, tablecloths, and cabriolet covers.

19. Carpets, sewing threads, ropes, wallhangings, textiles, wallpapers, garments, tents, decorative curtains, theater curtains and stitching comprising the textile articles of claim 17.

20. The textile fabric of claim 5, wherein the temperature of the solvent for the base material is from 25 to 100° C.

21. The textile fabric as claimed in claim 13, wherein the spacing between individual particles bonded to the base material A is 2-3 particle diameters.

22. The textile fabric having a self cleaning and water repellant surface according to claim 1, wherein the at least one synthetic base material A is a woven polyester fabric, and the treating comprises pulling the woven polyester fabric into a bath comprising dimethylsulfoxide (DMSO) as the at least one solvent and a suspension of hydrophobicized silica as the particles.

* * * * *